A. KINGSBURY.
BEARING.
APPLICATION FILED MAR. 14, 1918.
1,400,168.
Patented Dec. 13, 1921.
2 SHEETS—SHEET 2.
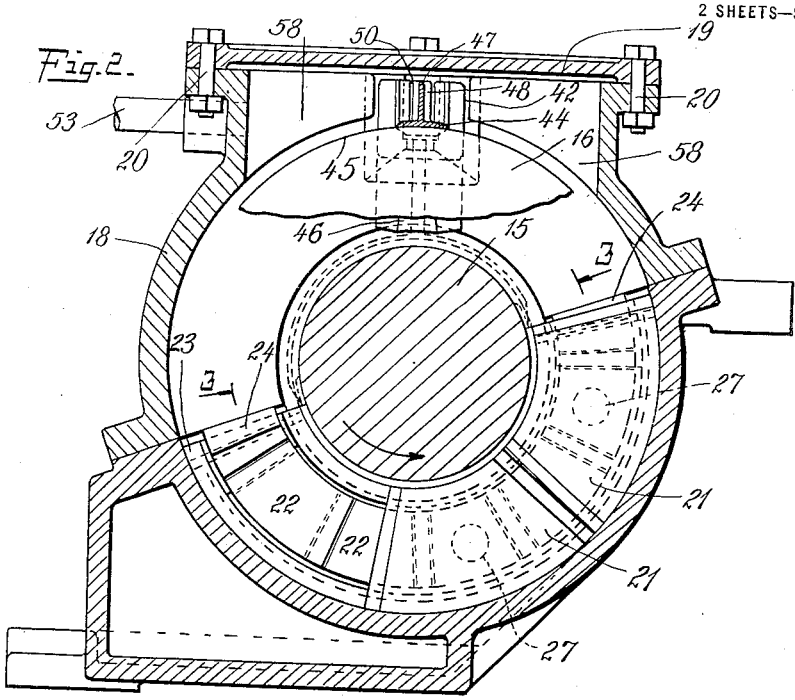
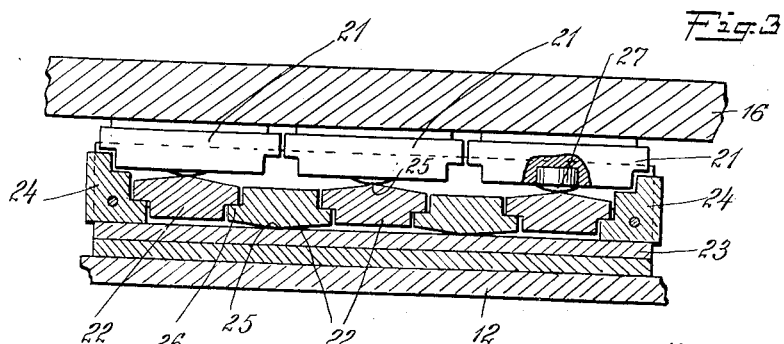
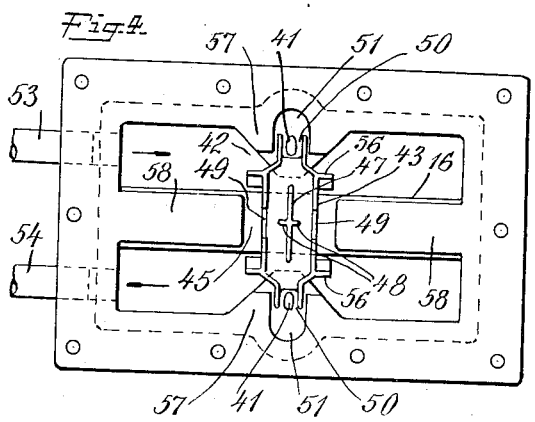
INVENTOR
Albert Kingsbury
BY
Marshall & Dearborn
ATTORNEYS

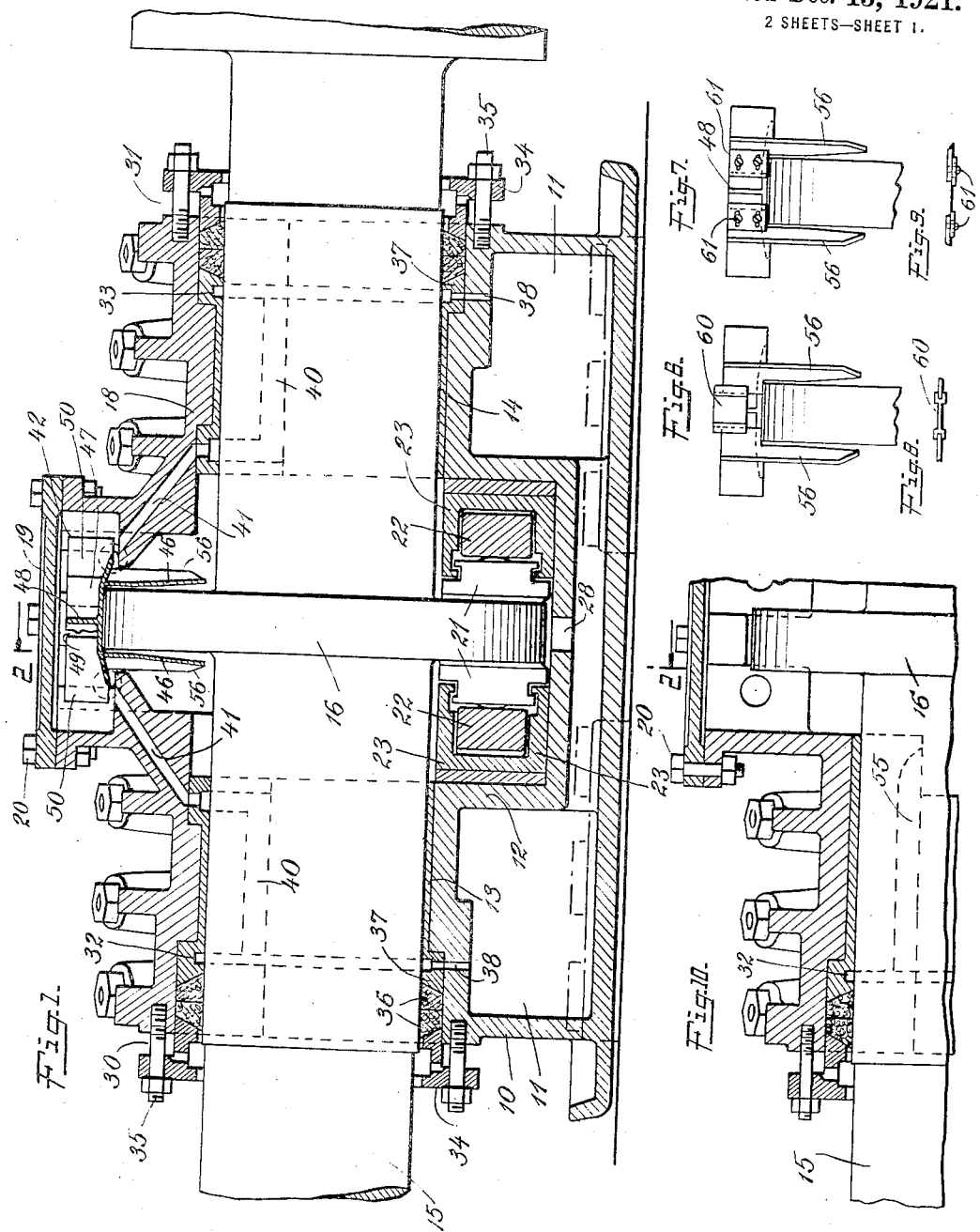

UNITED STATES PATENT OFFICE.

ALBERT KINGSBURY, OF PITTSBURGH, PENNSYLVANIA.

BEARING.

1,400,168.  Specification of Letters Patent.  Patented Dec. 13, 1921.

Application filed March 14, 1918. Serial No. 222,336.

*To all whom it may concern:*

Be it known that I, ALBERT KINGSBURY, a citizen of the United States of America, and a resident of Pittsburgh, Allegheny county, and State of Pennsylvania, have invented certain new and useful Improvements in Bearings, of which the following is a specification, reference being had to the accompanying drawings, forming a part thereof. My invention relates to bearings, particularly thrust bearings and combined guide and thrust bearings. It has special reference to thrust bearings of the type which employ tiltable bearing portions, segments or shoes and is suitable for use with inclined or horizontal shafts, such for example as the propeller shaft of a ship.

The problem of providing lubrication for horizontal or inclined thrust bearings of this class is usually more difficult than that of supplying oil to thrust bearings for vertical shafts, because in bearings of the horizontal or inclined type a considerable portion of the thrust engaging surfaces are, in many cases, above the level of the oil chamber or reservoir, while in bearings of the vertical type all portions of the engaging surfaces can be completely immersed in a bath or pool of lubricant.

One object of my present invention is to provide a simple and improved bearing structure which is particularly adapted for use with a horizontal or inclined shaft and which is arranged to automatically flood all of the bearing members with a copious supply of oil when the bearing is in operation.

Another object is to provide a combined guide and thrust bearing structure in which a continuous circulation of oil will be maintained over all of the thrust engaging surfaces and also from end to end of the guide bearings, and also one that will function as aforesaid irrespective of the direction of shaft rotation.

Another object is to provide a simple and effective oil scraper and distributor which is arranged to collect the oil from a revolving oil carrying surface on one of the bearing members and which is preferably held loosely in place so that it is free to "float" on the revolving surface as the bearing member revolves.

Another object of my invention is to provide a thrust bearing composed of tiltable bearing portions, segments or shoes which are disposed in engagement with a portion only of the thrust collar, and to also provide means for equalizing or equitably distributing the bearing pressure between the bearing portions without depending on a complete circumferential distribution of the equalizer parts.

In order that my invention may be thoroughly understood, I will now proceed to describe the same in the following specification and will then point out the novel features thereof in appended claims.

The invention is capable of receiving a variety of mechanical expressions, some of which are shown on the accompanying drawings, but it is to be expressly understood that the drawings are for the purpose of illustration only and are not to be construed as a definition of the limits of the invention, reference being had to the appended claims for that purpose.

Referring to the drawings:

Figure 1 is a longitudinal section of a thrust bearing arranged and constructed in accordance with my invention and constituting one embodiment thereof.

Fig. 2 is a transverse section of the same bearing taken on the line 2—2 of Fig. 1.

Fig. 3 is a developed section taken on the line 3—3 of Fig. 2.

Fig. 4 is a plan view showing a portion of the housing with the cover plate removed to disclose the floating oil scraper.

The scraper itself is shown in detail perspective in Fig. 5.

Figs. 6 and 7 are front elevations of the scraper resting and floating on its rotating collar support and provided in the respective figures with vertically and horizontally adjustable gates.

The gates are shown in detail in Figs. 8 and 9.

Fig. 10 is a partial section, corresponding to a portion of Fig. 1, of another structure which also constitutes an embodiment of my invention.

In the form shown 10 is a bearing housing having oil reservoirs 11 near each end at the bottom and a cylindrical chamber which forms an inner housing 12 for the thrust members and a support for the bearing segments or shoes which form parts thereof. A pair of guide bearings 13 and 14 are provided one on each side of the chamber 12.

15 designates a horizontal shaft which is rotatively mounted in the guide bearings 13 and 14. Affixed to the shaft is a thrust collar 16 which fits loosely into the cylindrical chamber 12 of the housing.

The housing may be divided, either in a horizontal plane or in an oblique plane as shown in Fig. 2. The oblique plane is particularly suitable for a housing designed for use in a restricted space, as in a ship. The oil reservoirs are shown as formed only at one side of the central vertical plane of the bearing, see Fig. 2, but this arrangement is also intended to adapt the housing to the space where it is to be located.

The upper half of the housing is designated 18 and has a cover 19 suitably fastened in position as by bolts 20. The arrangement of parts is such that either the cover 19 may be removed to inspect the bearing or the upper half of the housing may be removed. The cover however may be removed without draining the oil from the housing.

When the thrust pressure sustained by the bearing is not sufficiently high to make a large number of shoes necessary, a group of shoes 21 may be disposed in the lower part of the housing only and engage only the lower part of the thrust collar 16. In the form shown in Fig. 3, there are three shoes in an arcuate series although some other number may be used if desired. The shoes are preferably supported on equalizing or pressure-distributing means of any suitable construction, preferably comprising an arcuate series of equalizing plates 22.

In the form shown, the shoes 21 and the plates 22 are held in place and supported by a ring sector 23 which is channel-shaped in cross-section and into which the equalizing plates 22 are set. At the respective ends of the ring sector 23 are stepped blocks or end members 24 which coöperate with the end equalizing plates and with the end shoes of the group.

Each equalizing plate has a blunt knife edge 25 extending radially across one surface, the radial edges of the opposite surface being recessed to form ledges 26. Alternate blocks are reversed so that the ledges coöperate to form loose, halved or overlapping joints. Thus, in the form shown in Fig. 3, two of the plates 22 are mounted on the supporting surface of the ring sector 23 in the bottom of the channel. One of the plates is reversed and rests on the ledges 26 of the first two. The other two are interposed between the end blocks 24 and the first two plates mentioned, one of the ledges 26 resting on one of the steps of the end block in each case.

The arrangement is such that a tilting or pivotal mount is provided for each shoe 21 by three of the plates and the coöperation of the plates is such as to equalize the pressure sustained by the shoes without necessitating a complete circumferential series of said plates.

Each shoe may be provided with a hardened insert 27 having a spherically curved surface arranged to coöperate with the blunt knife edge of the corresponding equalizing plate, and similarly hardened inserts may be provided in the equalizing plates 22 if desired.

In the form shown in Fig. 1 the cylindrical housing 12 is provided with an oil passage 28 at the bottom which establishes communication between the inner chamber and the reservoirs 11. Near the outer ends of the guide bearings 13 and 14 are stuffing boxes 30 and 31 and adjacent to the stuffing boxes are annular grooves 32 and 33. Each of the stuffing boxes is shown as comprising an adjustable wedging ring 34 which is secured to the end of the housing by bolts 35 and squeezes a suitable packing material 36 against the beveled edge surface 37 on the outer end of the bearing sleeve and against the shaft. The bearing housing is adapted to be filled with oil to a level above the bottom of the shaft, the stuffing boxes being depended upon, in conjunction with the cylinder or guide bearings, for preventing loss of oil around the shaft.

The oil scraper or collector 42, in the form shown in detail in Figs. 4 and 5, comprises a box-like structure 43 having a bottom surface 44 which is transversely curved to substantially conform to the circumferential surface 45 of the thrust collar 16 (see Fig. 2) on which it is mounted. Said box has projections 46 which extend radially inward on opposite sides of the thrust collar so as to center the box thereon and it also has downwardly and inwardly projecting vanes or wings 56 which extend forwardly of the projections 46 and which constitute oil deflectors as hereinafter explained. It also has a central longitudinal partition 47 which is provided with lugs 48 and which together divide the interior of the box into four communicating chambers. Notches or apertures 49 on opposite sides of the box form inlet openings for a portion of the oil collected from the rotating surface of the thrust collar, the oil entering the box through either of said openings being divided into two streams by one of the lugs 48, and being discharged through outlet openings 50 at the ends of the box. The ends of the box are shown as extending into pockets 51 formed in inwardly projecting lugs 57 on the housing member 18, and from these pockets passage ways 41 lead outwardly and downwardly to the inner ends of longitudinal grooves or slots 40 in the upper part of the guide bearings 13 and 14. The outer ends of these longitudinal slots communicate with the annular grooves 32 and 33, and the lower sides of these grooves are connected with the reservoirs 11—11 by vertical passage ways 38.

When the bearing is in operation the oil is carried upward from the reservoir at the bottom of the housing on the rotating circumferential surface of the thrust collar, and the bottom edge of the collector box 42, toward which the surface is moving, acts as a scraper and removes a large proportion of the oil therefrom, the remainder forming a thin oil film on which the scraper rides or "floats". A part of the oil collected by the scraper flows into the box through the opening 49, and is discharged, in the manner already described, through the outlets 50 into the passage ways 41, and then flows by gravity through these passage ways into the grooves or slots 40 and the annular grooves 32, 33, and finally back into the reservoirs 11—11 through the passage ways 38. The remainder of the oil that is scraped off from the revolving surface is deflected radially downward and inward by the wings 56 of the collector box 42 onto the upper side of the revolving shaft 15, and thence flows outwardly over the bearing surfaces of the thrust collar and through the spaces between the bearing shoes, thus keeping the bearing surfaces continually flooded in oil while the bearing is in operation. In order to control or regulate the relative amount of oil that is discharged through the outlets 50 as compared with the amount that is diverted downwardly and inwardly by the side walls and wings of the box 43, the openings or notches 49 may be made variable in width or in height; and for the purpose of readily providing for such variation sliding gates 60 or 61 such as those shown in Figs. 6 to 9 may be suitably secured to the side walls of the box, and adjusted as desired.

Attention is directed to the fact that even when the oil level is sufficiently high to flood the bearing shoes when the parts are at rest, centrifugal force tends to cause those portions of the shoe surfaces which are close to the shaft to run dry when the shaft and thrust collar are rotating at high speed. This tendency is fully overcome and the bearing shoes are kept constantly flooded with oil and completely lubricated by the use of my invention.

The scraper or collector is shown as symmetrically constructed and mounted with respect to the thrust collar on which it floats or rides, and is therefore equally effective in collecting and distributing the oil to the different portions of the bearing irrespective of the direction of shaft rotation. The grooves 40 extend longitudinally of the shaft and they are therefore also equally effective in securing the desired circulation of oil through the guide bearings for both clockwise and counterclockwise movements.

If desired a continuous circulation of oil through the housing may be maintained by any suitable external pumping means (not shown) connected to pipes 53 and 54 that enter the upper portion, 18, of the thrust collar housing. In such case the oil which enters through either pipe—for example the pipe 53—flows toward the center of the housing chamber along one side of the rotating thrust collar and is deflected inwardly and downwardly toward the bearing shoes by the projecting walls and wings 46 and 56 of the scraper box. A portion of this oil also passes under the side lugs 57, which contain the feed pockets 51, to the other side of the housing chamber i. e., that opposite the pipe connections 53—54, and also flows over the rotating surface of the collar to the opposite side of the housing chamber and then back to the circulating pump through the outlet pipe 54. In order to secure a more effective circulation of the oil through all parts of the housing chamber—for both directions of shaft rotation—the housing member 18 is shown as provided with central inwardly projecting wing walls 58—58, that are of substantially the same thickness as the thrust collar and are curved on their lower faces to conform quite closely to the circumferential surface thereof. These projecting wing or baffle walls serve to prevent any transverse movement of the oil across the rotating thrust collar except at points in proximity to the collecting and deflecting edges of the scraper member 42, and thus coöperate with the latter member—and with the oil circulatory means—in securing the desired positive movement of the lubricant over and through all of the bearing surfaces.

The oil circulation through the guide bearings will still be maintained if the scraper is omitted and the oil passages 55 substituted for the passages 40, as shown in Fig. 10, but I now consider the arrangement employing the oil scraper and deflector as preferable.

While the embodiment of the invention illustrated on the drawings has been described in considerable detail, it is to be understood that the invention is not limited thereto, as the same is capable of receiving a variety of expressions some of which will readily suggest themselves to those skilled in the art while certain features thereof are capable of use without other features thereof. While the bearing structure has been shown as duplicated on opposite sides of the thrust collar for use with a shaft on which the thrust may be in either direction, it will be understood that if the thrust is to be in one direction only the thrust bearing members need be supplied on only one side of the thrust collar. Changes may also be made in the details of structure or arrangement without departing from the spirit of my invention. Reference is, therefore, to be had to the claims hereto appended for the definition of the limits of this invention.

What I claim is:

1. A bearing structure comprising a sector-shaped support provided with fixed end members, a series of equalizing plates supported thereon partially on the end members and partially on each other, and bearing shoes mounted on the said equalizing plates.

2. An equalizing structure for bearings comprising a sector-shaped member, a plurality of equalizing plates mounted on the sector-shaped member, and means for supporting the end plates of the equalizing system without interfering with its equalizing action.

3. An equalizing structure for bearings comprising a sector-shaped support, equalizing plates mounted thereon, bearing shoes mounted on the said plates, and means for jointly supporting the end elements of the equalizing plates and holding the shoes in position.

4. An equalizing structure for bearings comprising an annular channel-shaped support, end blocks supported therein and provided with ledges on their adjacent surfaces, one or more equalizer plates tiltably mounted in the channel support, bridging plates mounted upon and spanning the spaces between the tiltable equalizer plates and between the said plates and the end members, and shoes mounted on the bridging plates.

5. A horizontal thrust bearing comprising spaced stationary guide bearings, a shaft rotatably mounted in the guide bearings and having a thrust collar between them, tiltable bearing shoes supported by the stationary guide bearings and coöperating with the thrust collar, an annular groove in each guide bearing, and an axial groove connecting said annular groove directly with the space between the guide bearings in which the thrust collar and shoes are disposed.

6. A horizontal thrust bearing comprising spaced guide bearings with stuffing boxes in the outer ends of the guide bearings, a shaft rotatably mounted in the same and having a thrust collar between them, tiltable bearing shoes supported at the inner ends of each guide bearing and coöperating with the thrust collar, annular grooves in the guide bearings near the stuffing boxes, and axial grooves directly connecting the annular grooves with the opening between the guide bearings in which the thrust collar and coöperating shoes are disposed.

7. A horizontal thrust bearing comprising a rotatable shaft having a thrust collar, a bearing housing inclosing the thrust collar, tiltable bearing shoes supported by the housing and coöperating with the thrust collar, and means for constantly maintaining a supply of oil in the upper part of the housing and above the top of the shaft when the bearing is in operation, said means comprising an oil scraper mounted on said collar and constructed to deflect the oil directly against the bearing surfaces of said collar.

8. A horizontal thrust bearing comprising a rotatable shaft having a thrust collar, tiltable bearing shoes coöperating with the thrust collar, guide bearings on the shaft on each side of the thrust collar and spaced therefrom to form a housing chamber for the bearing shoes, and means for securing a circulation of oil between the said housing chamber in which the tiltable shoes are disposed and the outer ends of the guide bearings, said means comprising oil passages leading to said guide bearings and an oil scraper mounted on said collar and constructed to deflect the oil directly into said oil passages.

9. A horizontal thrust bearing comprising a bearing housing formed to provide a pair of spaced guide bearings with oil reservoirs below them and an enlarged central housing chamber between them, stuffing boxes at the outer ends of the guide bearings, a shaft rotatively mounted in the guide bearings and having a thrust collar in the central housing chamber, tiltable bearing shoes mounted in said chamber and coöperating with the thrust collar, annular grooves in the guide bearings near their outer ends, passageways connecting the said grooves with the oil reservoirs, and other passageways in the guide bearings connecting the said annular grooves directly with the central housing chamber.

10. A horizontal thrust bearing comprising a guide bearing, a stuffing box in one end of the guide bearing, a shaft rotatably mounted in the guide bearing and having a thrust collar adjacent to the opposite end of the guide bearing, tiltable bearing shoes coöperating with the thrust collar, and an axial groove in the guide bearing communicating with the space in which said shoes are positioned for permitting a movement of oil directly from said space to the outer end of the said guide bearing.

11. A horizontal bearing comprising a rotatable shaft having a thrust collar, a bearing housing, a guide bearing secured to the said housing, means for preventing oil from escaping around the shaft at the outer end of the guide bearing, tiltable bearing shoes interposed between the end of the guide bearing and the adjacent side of the thrust collar, and means for leading oil directly to said guide bearing from the space in which said shoes are positioned 12. A horizontal thrust bearing comprising a rotatable shaft having a thrust collar, a bearing housing, a guide bearing forming a part of said bearing housing, tiltable bearing shoes interposed between the thrust collar and the said guide bearing, and a passage for conducting oil directly from the space in which the tiltable shoes are disposed to said guide bearing.

13. A horizontal thrust bearing comprising a bearing housing formed to provide a guide bearing with an oil reservoir below it and an enlarged annular chamber at its inner end, a stuffing box at the outer end of the guide bearing, a shaft rotatively mounted in the guide bearing and having a thrust collar in the said annular chamber, tiltable bearing shoes coöperating with the thrust collar and disposed in the space between the thrust collar and the guide bearing, an annular groove in the guide bearing near its outer end, a passage connecting the groove with the lower oil reservoir, and an axial groove in the guide bearing connecting the outer annular groove directly with the enlarged inner annular chamber.

14. In a bearing, the combination of a substantially horizontal shaft having a rotatable thrust collar, relatively stationary thrust bearing members coöperating with the rotatable thrust collar, an oil reservoir into which the collar extends, and a relatively stationary scraper or collector mounted on the thrust collar and arranged to divert oil carried up by the thrust collar directly onto the shaft near the side of the said collar.

15. In a bearing, the combination of a substantially horizontal shaft having a rotatable thrust collar, relatively stationary thrust bearing members coöperating with the said collar, a guide bearing for the shaft, an oil reservoir below the shaft into which the thrust collar extends, and a relatively stationary scraper or collector mounted on the rotatable thrust collar and arranged to collect oil therefrom and divert a portion of the said oil directly onto the shaft near the collar and another portion into the guide bearing.

16. In a bearing, the combination of a substantially horizontal shaft having a rotatable thrust collar, thrust bearing members coöperating therewith, an oil reservoir into which the said collar extends, and a box-shaped scraper or collector mounted on the thrust collar and provided with side walls for diverting a portion of the oil to the top of the shaft near the thrust collar and with inlet notches in the said side walls for directing a portion of the oil into the box-shaped collector.

17. In a bearing, the combination of a substantially horizontal shaft, a guide bearing therefor, a thrust collar secured to the shaft, relatively stationary thrust bearing members coöperating with the thrust collar, an oil reservoir into which the said collar extends, and a box-shaped scraper or collector mounted on the thrust collar and provided with side walls for diverting a portion of the oil to the top of the shaft near the thrust collar and with inlet notches in the said walls for collecting a portion of the oil in the box and directing it to the guide bearing.

18. In a bearing, the combination of a substantially horizontal shaft, a guide bearing therefor, a thrust collar secured thereon and provided with a substantially cylindrical oil carrying surface, an oil reservoir into which the said surface extends, a plurality of bearing shoes coöperating with the thrust engaging face of the collar, a relatively stationary scraper having its bottom surface shaped to conform to the cylindrical surface of the thrust collar and mounted thereon, the said scraper or collector comprising a trough or open ended box extending longitudinally of the bearing across the thrust collar with oil deflectors extending downwardly therefrom and with notched sides which are adapted to collect a portion of the oil from the rotating cylindrical surface of the thrust collar.

19. In a bearing, the combination of a shaft having a thrust collar, and a scraper or oil collector mounted to ride freely on the surface of the said collar, the said scraper comprising a trough or box having notches in its opposite sides to admit a portion of the oil to the interior of the box and also having deflecting vanes for directing other portions of the oil toward the inner portion of the thrust collar.

20. In a bearing, the combination of a rotatable shaft having a substantially cylindrical enlargement which constitutes an oil carrying surface, and a scraper or oil collector freely mounted directly on the oil carrying surface and supported by a thin oil film thereon.

21. In a bearing, the combination of a rotatable shaft having a substantially cylindrical enlargement which constitutes an oil carrying surface, a scraper or oil collector freely mounted directly on the said oil carrying surface and supported by a thin oil film thereon, and means for holding the scraper in a relatively stationary position with respect to the said surface.

22. In a bearing, the combination of a rotatable shaft having an enlargement which constitutes an oil carrying surface, and a box-shaped oil collector mounted to ride or float freely on said oil carrying surface, the said collector having a wall provided with an inlet notch for admitting a portion of the oil to the interior of the collector box and with lateral projections for deflecting another portion of the oil to the upper side of the shaft.

23. In a bearing, the combination of a rotatable shaft having an enlargement which constitutes an oil carrying surface, and a scraper or oil collector mounted thereon, the said collector comprising a box-shaped receptacle provided with means for directing a portion of the oil into the collector and with other means for laterally deflecting other portions of the oil to one side of the oil carrying surface.

24. In a bearing, the combination of a shaft having an enlargement which constitutes an oil carrying surface, a scraper or oil collector floating on the oil carrying surface and supported by a thin oil film thereon, the said scraper having the form of a receptacle provided with means for directing a portion of the oil into the receptacle and discharging it from the ends thereof, and with other means for laterally deflecting other portions of the oil to one side of the oil carrying surface.

25. In a bearing, the combination of a rotatable shaft, a collar secured thereon, a housing inclosing said collar and forming an annular chamber in which the collar rotates, a scraper or oil collector mounted on the peripheral surface of the rotating collar, and means for directing a current of oil into one side of the annular chamber and against the face of the oil collector, the said collector being formed to direct a portion of the said oil into the collector and to direct other portions laterally to one side of the rotating collar.

26. In a thrust bearing, the combination of a rotatable thrust collar, a housing inclosing said collar and constituting a support for bearing shoes coöperating therewith, a floating oil collector supported on the peripheral surface of the thrust collar, and means for establishing a flow of oil through the housing chamber, in which the thrust collar and the bearing shoes are inclosed, and for directing that flow against the faces of the floating collector, said collector being constructed to divide said oil current and deflect it in part toward the bearing surfaces between the thrust collar and the bearing shoes and in part toward the ends of the bearing housing.

27. In a thrust bearing, the combination of a rotatable shaft, a thrust collar secured thereto, a guide bearing therefor, relatively stationary bearing shoes coöperating with the thrust collar, a housing surrounding the said shoes and said collar and forming an annular chamber inclosing them, an oil collector mounted to float freely on the peripheral surface of the thrust collar, and means for directing a current of oil into the housing chamber and against the face of the oil collector, the latter being formed to divide the said oil current and direct one portion thereof inwardly toward the bearing surfaces between the thrust collar and the shoes and another portion thereof laterally outward into the guide bearing.

28. In a bearing, the combination of a rotatable oil carrying surface, a relatively stationary oil scraper or collector coöperating therewith and adapted to collect the oil therefrom, and means for dividing the flow of oil thus collected into two streams, one of which is directed outwardly along the axis of the bearing, and the other of which is directed inwardly toward the same axis.

29. In a bearing, the combination of a rotatable oil carrying surface, a relatively stationary oil scraper or collector adapted to collect a portion of the oil therefrom and divide it into two streams, and means for adjusting and controlling the relative amount of oil in the said streams.

30. In a combined guide and thrust bearing, the combination of a rotatable oil carrying surface, a scraper or collector coöperating therewith and adapted to remove a portion of the oil therefrom, means for diverting a portion of the oil thus collected toward the thrust engaging members of the bearing and means for diverting another portion of said oil toward the guide members of the bearing.

31. In a combined guide and thrust bearing, the combination of a rotatable oil carrying surface, a relatively stationary oil collector coöperating therewith and adapted to divide the oil collected therefrom into two streams, means for directing one of said streams inwardly toward the thrust members of the bearing, other means for directing the other of said streams toward the guide members of the bearing, and means for adjusting and controlling the relative flow of oil in these two streams.

32. In a bearing, the combination of a rotatable shaft, a collar secured thereon, a housing surrounding the said collar and provided with inwardly projecting walls which closely embrace the periphery thereof, an oil deflector mounted in a gap in the said walls, and means for directing a flow of oil into the housing chamber and against the side of the deflector, the said deflector being formed to divide the said flow of oil into two streams one of which is directed toward the axis of the chamber and the other of which is directed toward the end of the chamber.

33. In a bearing, the combination of a rotatable oil carrying member, a housing inclosing the said member, curved wing walls projecting from the inner surface of the housing and coöperating with the oil carrying member to form two annular housing chambers, and means for establishing a flow of oil into and through both of the said chambers when the bearing is in operation.

34. In a combined guide and thrust bearing, the combination of a rotatable shaft, a thrust collar secured thereon, a housing surrounding the said collar and provided with inwardly projecting wing walls that closely embrace the periphery of the collar and serve in conjunction therewith to divide the interior of the housing into two chambers, and means for directing a flow of oil into the said chambers and diverting a portion of such flow outwardly from the ends thereof into the guide members of the bearing.

35. In a combined guide and thrust bearing, the combination of a rotatable shaft, a thrust collar secured thereon, a housing which surrounds the said collar and forms in conjunction therewith annular chambers on either side thereof, and means for maintaining a flow of oil through both of the said chambers and diverting a portion of that flow outwardly from the ends of the chambers and into the guide members of the bearing when the latter is in operation.

36. In a bearing, the combination of a rotatable oil carrying member, a housing surrounding the said member and forming in conjunction therewith two annular chambers, and a scraper or oil collector coöperating with the oil carrying member and adapted to direct the oil collected therefrom directly into both of the said chambers.

37. In a combined guide and thrust bearing, the combination of a rotatable shaft, a thrust collar mounted thereon and provided with an oil carrying surface, a housing surrounding the said collar and forming in conjunction therewith two chambers, and an oil collector coöperating with the oil carrying surface and adapted to discharge the oil collected therefrom in a plurality of streams and direct them in part toward the centers of both chambers and in part toward the outer ends thereof.

38. In a bearing, the combination of a rotatable oil carrying member, a housing surrounding the said member and provided with inwardly projecting walls that closely embrace the surface of the said member and serve in conjunction therewith to divide the housing into two chambers, an oil collector mounted in a gap in the said walls, and means for maintaining a flow of oil through the said gap and past the oil collector, the said collector being adapted to divide this flow into a plurality of streams and direct them in part inwardly toward the axis of rotation of the bearing and in part laterally toward the outer ends of the housing chambers.

39. In a combined guide and thrust bearing, the combination of a rotatable thrust collar provided with an oil carrying surface, bearing shoes coöperating with said collar, a housing inclosing the thrust collar and bearing shoes and provided with inwardly projecting walls that closely embrace the oil carrying surface of the thrust collar, an oil collector mounted in a gap in the said walls and adapted to remove the oil from the oil carrying surface when the thrust collar is rotating, and means for keeping the interior of the housing filled with oil and directing its flow against the said oil collector, the latter being formed to divide said flow into a plurality of streams and direct them in part toward the engaging surfaces of the thrust collar and the bearing shoes and in part toward the guide members of the bearing.

40. In a bearing, the combination of a rotatable thrust collar having an oil carrying surface, and a double sided oil collector coöperating with the said surface and adapted to collect the oil therefrom and discharge it laterally thereof directly against both bearing surfaces of said collar irrespective of the direction of rotation of the said collar.

41. In a bearing, the combination of a rotatable thrust collar having an oil carrying surface, with an oil scraper arranged to coöperate therewith in the collection of oil and constructed to deflect part of the oil toward the axis of the bearing and part toward the end of the bearing when the oil carrying surface revolves in either direction.

42. A bearing structure comprising a support, an arcuate series of equalizing plates mounted thereon, fixed end members mounted on said support and coacting with the end elements of said series, and bearing segments mounted on said equalizing plates.

43. A bearing structure comprising a support, end members fixedly mounted on said support, one or more equalizing plates tiltably mounted on said support between said end members, bridging plates bridging the spaces between the equalizing plates and between said plates and said end members, and bearing segments mounted on said bridging plates.

44. A horizontal thrust bearing comprising a guide bearing, a shaft rotatably mounted in said guide bearing and having a thrust collar, tiltable bearing shoes coöperating with said thrust collar, and an axial groove in said guide bearing communicating directly with the space in which said shoes are disposed for conducting oil from said space to said guide bearing.

45. A horizontal thrust bearing comprising a guide bearing, a shaft rotatably mounted in said guide bearing and having a thrust collar, tiltable bearing shoes coöperating with said thrust collar, an annular groove in said guide bearing adjacent the outer end thereof, and an axial groove in said guide bearing for conducting oil to said annular groove directly from the space in which said shoes are disposed.

46. In a bearing, the combination of a substantially horizontal shaft having a rotatable thrust collar, relatively stationary thrust bearing members coöperating with faces of said collar, an oil reservoir into which said collar extends, and a relatively stationary scraper or collector coacting with said thrust collar and constructed to deflect oil directly against both bearing surfaces of said collar.

47. In a bearing, the combination of a substantially horizontal shaft having a rotatable thrust collar, relatively stationary thrust bearing members coöperating with said collar, a guide bearing for said shaft, an oil reservoir into which said collar extends, and a relatively stationary scraper or collector coacting with said collar and constructed to deflect a portion of the oil directly onto the bearing surface of said collar and a portion into the guide bearing.

48. In a bearing, in combination with a rotatable collar having an oil-carrying surface, an oil scraper or collector coöperating with said surface and comprising a box-like structure having an opening in its wall to admit a portion of the oil to the interior thereof, and an inwardly directed vane for deflecting a portion of the oil directly against the bearing surface of said collar.

49. In a combined thrust and guide bearing, in combination with a rotatable thrust collar having an oil-carrying surface, an oil scraper or collector coöperating with said surface and comprising a box-like structure having an opening in its wall to admit a portion of the oil to the interior thereof and another opening in its wall to direct the admitted oil toward the guide bearing.

50. In a bearing, in combination with an oil-carrying surface, an oil scraper or collector coöperating therewith and comprising a box-like structure having opposed oil admitting openings in its walls, opposed oil exit openings in its walls, and interior partitions for directing the flow of oil through said exit openings.

51. In a bearing, in combination with a rotatable thrust collar having an oil-carrying surface, an oil scraper or deflector coöperating with said surface and having a downwardly and inwardly extending vane for directing the oil against the thrust surface of said collar.

52. In a device for the lubrication of the journal bearings of a shaft, the combination of a housing formed with an oil well, a series of pivoted segments constituting the bearings and carried by the housing, a member fixed to the shaft and dipping into the well, and a scraper designed to remove the oil from the surface of said member and deflect it directly to the journal bearings.

53. In a bearing, in combination with a rotatable oil-carrying surface, an oil scraper or collector adapted to collect oil therefrom and simultaneously direct the collected oil both axially and radially of the axis of the bearing.

54. In a combined guide and thrust bearing, a rotatable thrust collar having an oil-carrying surface, and an oil scraper or collector coöperating with said oil-carrying surface and adapted to deflect oil simultaneously and directly to both the thrust bearing members and the journal bearing members.

In witness whereof, I have hereunto set my hand this 12th day of March, 1918.

ALBERT KINGSBURY.